US012790824B2

(12) United States Patent
Mastrangelo

(10) Patent No.: US 12,790,824 B2
(45) Date of Patent: Nov. 10, 2026

(54) THERMOPLASTIC ROOFING MEMBRANE COMPOSITES WITH PROTECTIVE FILM AND METHODS FOR INSTALLING THE SAME

(71) Applicant: Amrize Technology Switzerland LLC, Zug (CH)

(72) Inventor: John C. Mastrangelo, Oconomowoc, WI (US)

(73) Assignee: Amrize Technology Switzerland LLC, Zug (CH)

( * ) Notice: Subject to any disclaimer, the term of this patent is extended or adjusted under 35 U.S.C. 154(b) by 63 days.

(21) Appl. No.: 18/844,116

(22) PCT Filed: Mar. 8, 2023

(86) PCT No.: PCT/US2023/014820

§ 371 (c)(1),
(2) Date: Sep. 5, 2024

(87) PCT Pub. No.: WO2023/172630

PCT Pub. Date: Sep. 14, 2023

(65) Prior Publication Data

US 2025/0188741 A1 Jun. 12, 2025

Related U.S. Application Data

(60) Provisional application No. 63/317,769, filed on Mar. 8, 2022.

(51) Int. Cl.

*E04D 5/14* (2006.01)
*B32B 5/02* (2006.01)

(Continued)

(52) U.S. Cl.

CPC .............. *E04D 5/149* (2013.01); *B32B 5/028* (2013.01); *B32B 7/06* (2013.01); *B32B 27/12* (2013.01);

(Continued)

(58) Field of Classification Search

CPC ........... E04D 5/149; E04D 5/06; E04D 5/142; E04D 5/10; B32B 5/028; B32B 7/06;

(Continued)

(56) References Cited

U.S. PATENT DOCUMENTS 4,601,935 A 7/1986 Metcalf et al.
4,860,514 A 8/1989 Kelly (Continued)

OTHER PUBLICATIONS

International Search Report and Written Opinion for corresponding PCT/US2023/014820 dated Jun. 12, 2023 (16 pp).

*Primary Examiner* — Michael N Orlando
*Assistant Examiner* — Abhishek A Patwardhan
(74) *Attorney, Agent, or Firm* — Renner, Kenner; Arthur M. Reginelli

(57) ABSTRACT

A method of installing thermoplastic roof membranes within a roofing system, the method comprising (i) providing a first membrane composite and positioning the membrane on a surface of the roof system, where the membrane composite includes a-protective film (ii) providing a second membrane composite and positioning the second membrane composite adjacent to the first membrane composite in an overlapping manner to provide a pre-seamed lap, where the second membrane composite includes a protective film (iii) heat welding the first and second membrane composites together at the pre-seamed lap, where heat welding incorporates a portion of the protective film of the first membrane com- (Continued)

posite into the seam; and (iv) removing the remaining portion of the protective film from the first membrane composite.

18 Claims, 2 Drawing Sheets

(51) Int. Cl.
*B32B 7/06* (2019.01)
*B32B 27/12* (2006.01)
*E04D 5/06* (2006.01)

(52) U.S. Cl.
CPC ............... *E04D 5/06* (2013.01); *E04D 5/142* (2013.01); *B32B 2260/021* (2013.01); *B32B 2260/046* (2013.01); *B32B 2307/7376* (2023.05); *B32B 2307/748* (2013.01); *B32B 2419/06* (2013.01)

(58) Field of Classification Search
CPC .............. B32B 27/12; B32B 2260/021; B32B 2260/046; B32B 2307/7376; B32B 2307/748; B32B 2419/06
See application file for complete search history.

(56) References Cited

U.S. PATENT DOCUMENTS

| | | | | |
|---|---|---|---|---|
| 5,322,724 | A | 6/1994 | Levens | |
| 5,486,249 | A | 1/1996 | Valaitis et al. | |
| 6,864,195 | B2 | 3/2005 | Peng | |
| 8,833,037 | B2 | 9/2014 | French et al. | |
| 9,163,410 | B2 | 10/2015 | French et al. | |
| 10,066,396 | B1 * | 9/2018 | Watkins, Jr. | E04D 5/148 |
| 10,132,082 | B2 | 11/2018 | Tang et al. | |
| 10,422,138 | B1 | 9/2019 | French et al. | |
| 11,788,292 | B1 * | 10/2023 | Burzynski | E04D 5/148 52/105 |
| 2001/0003625 | A1 | 6/2001 | Apgar et al. | |
| 2005/0066621 | A1 | 3/2005 | Fritz | |
| 2005/0183261 | A1 | 8/2005 | Nebesnak et al. | |
| 2009/0320383 | A1 | 12/2009 | Taylor et al. | |
| 2009/0320987 | A1 * | 12/2009 | Hubbard | B32B 15/14 428/354 |
| 2013/0263552 | A1 * | 10/2013 | French | B32B 27/304 428/521 |
| 2020/0270866 | A1 * | 8/2020 | Yancey | E04D 5/148 |
| 2022/0194047 | A1 | 6/2022 | Zhang et al. | |
| 2022/0275646 | A1 * | 9/2022 | Jiang | B32B 7/12 |
| 2023/0235560 | A1 * | 7/2023 | Tang | B32B 21/08 52/309.1 |
| 2023/0358046 | A1 * | 11/2023 | Duhamel | B32B 25/12 |

* cited by examiner

THERMOPLASTIC ROOFING MEMBRANE COMPOSITES WITH PROTECTIVE FILM AND METHODS FOR INSTALLING THE SAME

This application is a National-Stage Application of PCT/US2023/014820 filed on Mar. 8, 2023, which claims the benefit of U.S. Provisional Application Ser. No. 63/317,769 filed on Mar. 8, 2022, which are incorporated herein by reference.

FIELD OF THE INVENTION

Embodiments of the present invention are directed toward thermoplastic roofing membrane composites that include a removable protective film that can advantageously be welded into the seams of roofing membrane systems, as well as methods for installing the membranes.

BACKGROUND OF THE INVENTION

Thermoplastic roofing membranes, which are also referred to as single ply thermoplastic roofing membranes, are commonly used to cover flat or low-sloped roofs. These membranes are often white in color, which serves several benefits including reflectivity of solar radiation. The membranes are advantageously installed by securing the membrane to the roof surface and thermally bonding (i.e. heat welding) adjacent membranes to each other to form a seam and thereby create a water-proof surface on the roof (i.e. a roofing membrane system).

A disadvantage of the white color of the membrane is that the membrane becomes stained or temporarily discolored during installation of the roof system. As those skilled in the art appreciate, this can be caused by foot traffic of the installers and/or from installation equipment, such as the welding equipment, used to form the seams. To address this issue, it is common for the installation process to conclude with a cleaning operation whereby the surface of the newly installed roof is cleaned. These operations, however, are time consuming and add to the overall cost of the roof installation.

Other solutions include the use of composite membranes that carry a protective film. Following installation of the roof system, the film, which protects the membrane during installation, can be removed to expose the underlying roofing membrane. A problem encountered with these composites, however, is the fact that the protective film must be removed prior to welding adjacent membranes to each other. This results in additional installation time that is required for partial removal of the protective film. Also, membrane exposure proximate to the weld can allow for staining or discoloration prior to removal of the remainder of the protective film.

SUMMARY OF THE INVENTION

One or more embodiments of the present invention provide a method of installing thermoplastic roof membranes within a roofing system, the method comprising (i) providing a first membrane composite and positioning the membrane on a surface of the roof system, where the membrane composite includes a roofing membrane including a top planar surface, a bottom planar surface, a first lateral edge, and a second lateral edge, and a protective film removably bonded to the top planar surface and the bottom planar surface in placed adjacent to the surface of the roof system; (ii) providing a second membrane composite and positioning the second membrane composite adjacent to the first membrane composite in an overlapping manner to provide a pre-seamed lap, where the second membrane composite includes a roofing membrane including a top planar surface, a bottom planar surface, a first lateral edge, and a second lateral edge, and a protective film removably bonded to the top planar surface; (iii) heat welding the first and second membrane composites together at the pre-seamed lap, where heat welding incorporates a portion of the protective film of the first membrane composite into the seam; and (iv) removing the remaining portion of the protective film from the first membrane composite.

Other embodiments of the present invention provide a membrane composite comprising (i) a roofing membrane including a top planar surface, a bottom planar surface, a first lateral edge, and a second lateral edge; and (ii) a protective film bonded to the top planar surface in a manner that allows the protective film to be removed from the top planar surface.

Yet other embodiments of the present invention provide a roof comprising a roofing membrane including a top planar surface, a bottom planar surface, a first lateral edge, and a second lateral edge, and a protective film bonded to the top planar surface in a manner that allows the protective film to be removed from the top planar surface.

Still other embodiments of the present invention provide a roof formed by a method comprising (i) providing a first membrane composite and positioning the membrane on a surface of the roof system, where the membrane composite includes a roofing membrane including a top planar surface, a bottom planar surface, a first lateral edge, and a second lateral edge, and a protective film removably bonded to the top planar surface and the bottom planar surface in placed adjacent to the surface of the roof system; (ii) providing a second membrane composite and positioning the second membrane composite adjacent to the first membrane composite in an overlapping manner to provide a pre-seamed lap, where the second membrane composite includes a roofing membrane including a top planar surface, a bottom planar surface, a first lateral edge, and a second lateral edge, and a protective film removably bonded to the top planar surface; (iii) heat welding the first and second membrane composites together at the pre-seamed lap, where heat welding incorporates a portion of the protective film of the first membrane composite into the seam; and (iv) removing the remaining portion of the protective film from the first membrane composite.

DETAILED DESCRIPTION OF ILLUSTRATIVE EMBODIMENTS

Embodiments of the invention are based, at least in part, on the discovery of a thermoplastic membrane composite that includes a removable, protective film that can be welded into a seam during installation of a roof system. The composite of the present invention offers several advantages including that the protective film does not require removal prior to fabrication of a seam. Among the discoveries associated with this invention is that when a film is compatible with the membrane, the film can be welded into the seam without having a deleterious impact on the seam. Accordingly, embodiments of the invention include a composite membrane, as well as methods for constructing a roof system by employing the membrane composites. In particular, embodiments of the invention include methods that include heat welding thermoplastic membrane where the protective film is sandwiched in the seam area.

Membrane Composite

Figure 1:
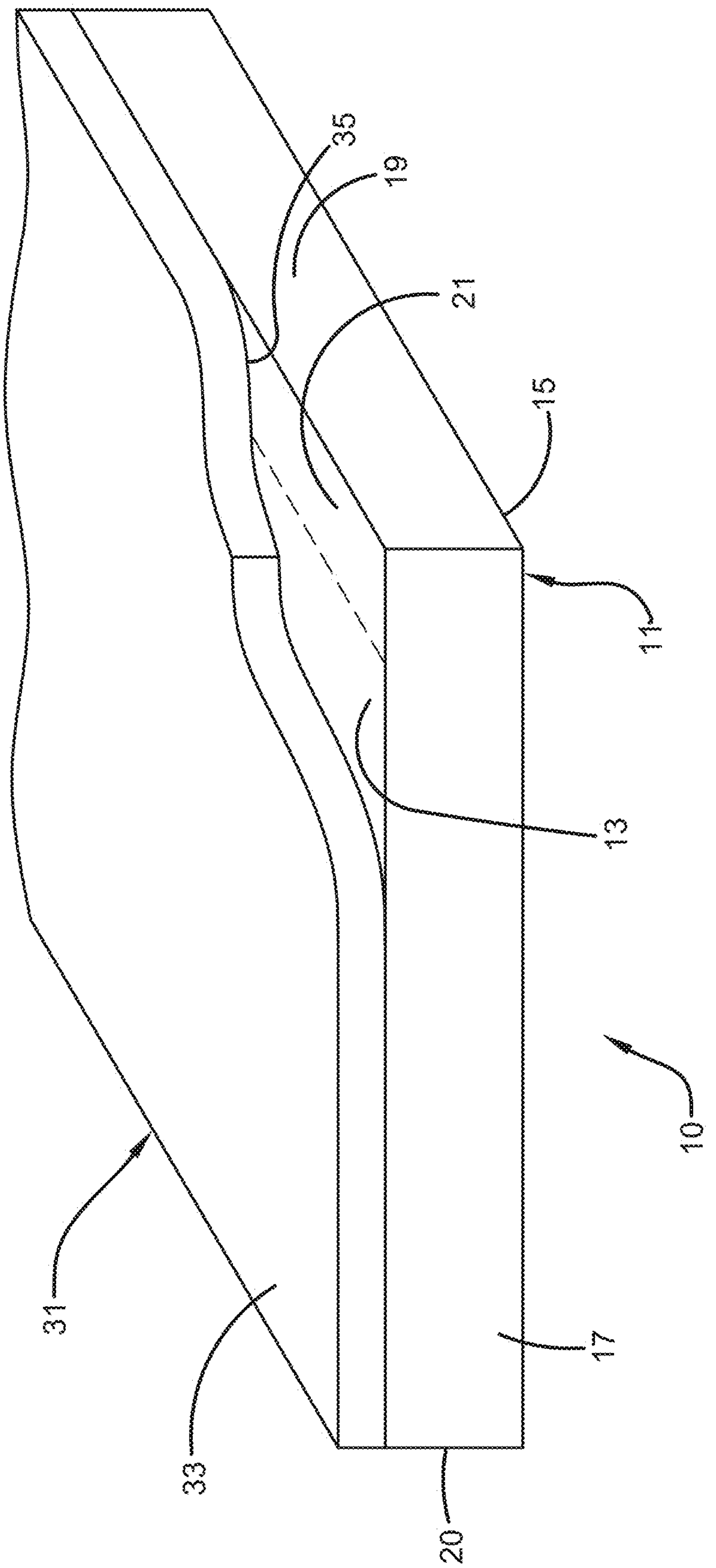
FIG. 1 is a perspective view of a roofing membrane composite according to embodiments of the invention.

Composites according to the present invention can be described with reference to FIG. 1, which shows composite 10 including a thermoplastic roofing membrane 11 having a top planar surface 13, a bottom planar surface 15, a first longitudinal edge 17, a second longitudinal edge opposite the first edge (not shown), a first lateral edge 19, and a second lateral edge 20. Lateral edge 19 helps define a lap region 21 that runs along lateral edge 19 on top planar surface 13. A similar lap region (not shown) runs along lateral edge 20 on top planar surface 13. The skilled person appreciates that a lap region (not shown) may also exist on bottom surface 15, along either lateral edge, and ultimately the lap region that forms a seam will be determined based upon the installation configuration. The width of the membrane can be defined from first lateral edge 19 to second lateral edge 20. The length of the membrane can be defined from first longitudinal edge 17 to the second longitudinal edge.

Protective film 31 is removably attached (e.g. heat bonded) to top planar surface 13 of membrane 11. As shown, protective film 31 extends across the width of membrane 11 by extending from first lateral edge 19 to second lateral edge 20. In one or more embodiments, protective film 31 is positioned flush to lateral edge 19 and, in one or more embodiments, also flush to lateral edge 20. In other embodiments, protective film 31 is substantially flush to first lateral edge 19 and/or second lateral edge 20, which refers to the fact that it may not extend entirely from first lateral edge 19 to second lateral edge 20, but covers a sufficient amount of top surface 13 of membrane 11 so as to offer appreciable protection from dirt or staining and/or other temporary discoloring of the membrane during installation. In one or more embodiments, protective film 31 covers at least 95%, in other embodiments at least 97%, and in other embodiments at least 99% of top surface 13 of membrane 11 between first lateral edge 19 and second lateral edge 20.

Roofing Membrane Characteristics

As suggested above, the membrane component of the composite is a thermoplastic roofing membrane, which may also be referred to as a single ply thermoplastic roofing membrane. Membranes of this nature may include those generally known in the art that are capable of providing a weather-proof outer layer to a roofing system, which refers to the fact that the membrane protects the roof from water and ultraviolet radiation. Thermoplastic roofing membranes include those that meet the specifications of ASTM 6878-03. These membranes may include scrim reinforcement; i.e. polymeric-extruded sheet sandwiching a reinforcement. The membranes may include multi-layered membranes with multiple co-extruded layers as shown in, for example, U.S. Publication Nos. 2009/0137168, 2009/0181216, 2009/0269565, 2007/0193167, and 2007/0194482, which are incorporated herein by reference The skilled person understands that thermoplastic roofing membranes generally include a thermoplastic polymer that forms a matrix of any given layer of the sheet, and one or more constituents of the membrane formulation may be discontinuous constituents of the sheet. For example, the thermoplastic polymer may serve as a matrix for fillers, flame retardants, and antidegradants.

Several thermoplastic polymers, and blends thereof, can be used to prepare the thermoplastic roofing membranes of this invention. These polymers may include reactor copolymers, propylene-based elastomers, and ethylene-based block copolymers. The skilled person understands that thermoplastic roofing membranes often include multiple layers, and the chemical composition of each layer can be the same or different. These differences can be based upon the additives used in each layer or the polymers used in each layers. Variation in polymers can include the use of distinct polymers or different blends of polymers, including variation in the blend of similar polymers. In this regard, U.S. Pat. No. 6,451,897 and U.S. Publication Nos. 2021/0300007, 2021/0108418, 2019/0308395, 2018/0355616, 2018/0094439 and 2018/0023301 are incorporated herein by reference.

The thermoplastic roofing membranes may be characterized by their thickness. In one or more embodiments, the roofing membrane has a thickness of greater than 1 mm, in other embodiments greater 1.1 mm, in other embodiments greater than 1.2 mm, in other embodiments greater than 1.5 mm, and in other embodiments greater than 1.7 mm. In these or other embodiments, the roofing membrane has a thickness that is less than 2.8 mm, in other embodiments less than 2.6 mm, and in other embodiments less than 2.2 mm. In one or more embodiments, the roofing membrane has a thickness of from about 1 to about 3 mm, in other embodiments from about 1.2 to about 2.8 mm, in other embodiments from about 1.5 to about 2.6 mm, and in other embodiments from about 1.7 to about 2.2 mm.

The thermoplastic roofing membranes may be characterized by their width. In one or more embodiments, the roofing membrane has a width of greater than 0.7 m, in other embodiments greater than 1 m, and in other embodiments greater than 1.5 m. In these or other embodiments, the roofing membrane has a width that is less than 10 m, in other embodiments less than 7 m, in other embodiments less than 5, and in other embodiments less than 4 m. In one or more embodiments, the roofing membrane has a width of from about 0.7 to about 10 m, in other embodiments from about 1 to about 7 m, and in other embodiments from about 2 to about 5 m. As the skilled person appreciates, the length of the thermoplastic roofing membrane is typically greater than 20 m, in other embodiments 30 m, or in other embodiments 40 m, with the limitations typically deriving from manufacturing, storage, shipment, and handling constraints.

Protective Film Characteristics

In one or more embodiments, the protective film, which may also be referred to as a protective layer, is a thermoplastic extruded sheet. As such, the protective film includes one or more thermoplastic polymers, which may be referred to as polymeric composition, that serve as a matrix in which optional constituents dispersed. These optional constituents may include filler, flame retardants, and antidegradants. In one or more embodiments, the thermoplastic polymers (polymeric composition) of the protective film may include the same polymers as the top and bottom layers (i.e. the matrix polymers forming the upper planar surface and bottom planar surface of the membrane) of the thermoplastic roofing membrane to which the protective film is removably bonded. In one or more embodiments, the thermoplastic polymers of the protective film are different than the polymers of the top layer and the bottom layer of the thermoplastic roofing membrane to which the protective film is removably bonded. In yet other embodiments, the thermoplastic polymers of the protective film are the same as the polymers of the top layer and the bottom layer of the thermoplastic roofing membrane to which the protective film is removably bonded but present in different proportions. In one or more embodiments, the membrane includes a first polymer within the top surface layer of the membrane and a second polymer in the bottom surface layer of the membrane, and the protective film includes a blend of the first and second polymers. In one or more embodiments, the polymeric composition from which the protective film is produced is compatible with the top and bottom layers of the thermoplastic roofing membrane, as described below.

The protective film may be characterized by its thickness. In one or more embodiments, the protective film has a thickness of greater than 35 μm, in other embodiments greater than 45 μm, and in other embodiments greater than 55 μm. In these or other embodiments, the protective film has a thickness that is less than 125 μm, in other embodiments less than 100 μm, and in other embodiments less than 80 μm. In one or more embodiments, the protective film has a thickness of from about 35 to about 125 μm, in other embodiments from about 45 to about 100 μm, and in other embodiments from about 55 to about 80 μm.

Nature of Attachment

As indicated above, the protective film is removably attached to the top surface of the roofing membrane. According to embodiments of the invention, the mode of attachment is through thermal bonding between two thermoplastic layers. In other words, one or both of the thermoplastic layers (i.e. the protective sheet and the membrane) are heated to an extent that thermoplastic polymer molecules within one or both of the thermoplastic layers are softened or flowable to an extent that they can diffuse into or otherwise temporarily bond with the other layer when the two layers (i.e. the roofing membrane and the protective film) are placed into contact with each other. The level of diffusion or bonding, however, is regulated so as to create a bond while allowing the film to be removed from the roofing membrane. The ability to control the level of diffusion and bonding and therefore control the level of bonding between the two layers is discussed in greater detail below.

In one or more embodiments, the degree of bonding between the protective film and the roofing membrane is sufficient (i.e. is of a strength) to withstand foot traffic (as may be experienced on a roof surface during installation) without becoming disengaged from the roofing membrane. On the other hand, the nature of the bond between the roofing membrane and the protective film is of an insufficient strength that allows for removal of the protective film from the roofing membrane by manual peeling techniques (e.g. an individual pulling on the film to thereby separate the film from the roofing membrane).

In one or more embodiments, the nature of the attachment between the protective film and the roofing membrane can be quantified based upon peel adhesion strength, which can be determined pursuant to ASTM D413-2017 for separation strength of two flexible materials bonded together using one-inch wide samples with T-peel test at 2 in/min. In one or more embodiments, the strength of the bond between the protective film and the roofing membrane, as determined by ASTM D413-2017 at room temperature is greater than 0.20, in other embodiments greater than 0.3, and in other embodiments greater than 0.35 lbf/in. It has been discovered that where the adhesion strength is below 0.2 lbf/in, the composite cannot withstand foot traffic that would be experienced on the roof during installation. In these or other embodiments, the peel adhesion strength between the protective film and the roofing membrane (ASTM D413-2017) is less than 2, in other embodiments less than 1.7, in other embodiments less than 1.5, in other embodiments less than 1.3, in other embodiments less than 1, in other embodiments less than 0.95, and in other embodiments less than 0.90 lbf/in. It has been discovered that were the adhesion strength is greater than 2 lbf/in, the protective film cannot be peeled away from the membrane following installation in a manner conducive to efficient installation of the roof system. In one or more embodiments, the peel adhesion strength between the protective film and the roofing membrane is from about 0.2 to about 2, in other embodiments from about 0.3 to about 1.7, in other embodiments from about 0.3 to about 1.5, in other embodiments from about 0.3 to about 1.3, in other embodiments from about 0.25 to about 1, in other embodiments from about 0.3 to about 0.95, and in other embodiments from about 0.35 to about 0.9 lbf/in.

Compatibility

As indicated above, aspects of the invention are achieved by employing a protective film that is compatible with the polymer system of the roofing membrane. In particular, the protective film is compatible with the top planar surface of the membrane to which it is attached and it is also compatible with the bottom planar surface of the membrane to which it is attached (i.e. the opposite planar surface to which it is attached) so that it can be welded into a seam between the top planar surface of a first membrane and the bottom planar surface of an adjacent membrane. It is believed that compatibility allows for the ability to advantageously weld the protective film into the seam.

In one or more embodiments, compatibility between the protective film and the roofing membrane is determined based upon the ability of the protective film to be welded between two layers of roofing membrane without having a deleterious impact on the weld from the standpoint of making a sufficient roofing seam. Stated differently, compatibility is based upon the ability of the roofing membrane and the protective film to be welded to each other and thereby form a bond of sufficient strength that can operate as a seam within a roofing system.

In one or more embodiments, compatibility is determined by welding the protective film between two scrim-reinforced thermoplastic roofing membranes to form a test seam, and subjecting the test seam to a peel test according to ASTM D413-2017 for separation strength of two flexible materials bonded together using one-inch wide samples with T-peel test at 20 in/min at room temperature. Where the test seam fails cohesively (e.g. failure occurs at the lamination surrounding the scrim reinforcement of either membrane or within the matrix of the membrane layers), then compatibility between the protective film and the roofing membrane is achieved. Failure (i.e. lack of compatibility) is determined where the test seam fails at the interface between the two roofing membranes (i.e. at or within the protective film), which may be referred to as adhesive failure. The skilled person appreciates that the adhesion strength required to establish compatibility is a function of the strength of the polymeric material that forms the membrane, as well as the strength of the weld between the membranes extrudates at the scrim, and thus a definitive strength cannot be provided for all roofing membranes. The ability to determine compatibility pursuant this invention can nonetheless be determined without undue calculation or experimentation.

Thermal Bonding Methods

As indicated above, the protective film is thermally, yet removably, bonded to the roofing membrane. The degree of bonding, however, is maintained within thresholds, as noted above (e.g. to achieve a peel strength of about 0.2 to about 2.0 lbf/in). Once armed with the teachings of this invention, the skilled person can readily, without undue experimentation, achieve the desired level of bonding between the protective film and the roofing membrane. Embodiments of the invention include manipulating one or more parameters of the thermal bonding process in order to achieve a desired level of bonding. In one or more embodiments, the degree of bonding can be controlled by the temperature of the protective film and/or the roofing membrane at the time the two are placed into contact with each other (i.e. at thermal bonding). The skilled person understands that this temperature is relative to the nature of the composition of the protective film and/or the roofing membrane. For example, the target temperature of the protective film or the roofing membrane could be a function of the melting temperature or glass transition temperature of one or more of the polymeric constituents within the protective film and/or the roofing membrane. The overall viscosity (and/or melt index) of the protective film and/or roofing membrane can also impact the desired target temperature.

The skilled person also understands that several techniques can be employed to control the target temperature. For example, where the protective film and/or the roofing membrane is extruded within an in-line operation where bonding takes place, the bonding operation can be placed sufficiently downstream from the extruder operation in order to allow the protective film and/or roofing membrane that is extruded in-line to cool to an appropriate temperature. In other embodiments, such as where a prefabricated film is bonded to a prefabricated roofing membrane, the production process may include heating one or both of the protective film and the roofing membrane. In other embodiments, the production process includes the use of a prefabricated protective film that is bonded to a roofing membrane extruded in-line such that the heat associated with the extrusion process can be used to thermally bond the roofing membrane and protective film together. In other embodiments, a reverse technique is employed. That is, a prefabricated roofing membrane is employed, and the roofing membrane is bonded to a protective film that is produced in-line by an extrusion process, and the heat of the extrusion process is employed to effect the thermal bonding.

The skilled person also understands that other parameters that can impact the degree of adhesion between the protective film and the roofing membrane include, but are not limited to, the pressure at which the protective film and roofing membrane are squeezed (e.g. with a nip roll) following initial lamination. Likewise, the amount of time that the protective film and membrane are squeezed (i.e. contact time within one or more nip rolls) can impact the adhesion achieved. For example, following initial lamination of the protective film and the membrane, the composite can be subjected to pressure (e.g. with a nip roll) of from about 20 to about 400 lbs/in, in other embodiments from about 25 to about 350 lbs/in, and in other embodiments from about 35 to about 250 lbs/in. In these or other embodiments, the composite can be subjected to these pressures for a duration of time from about 0.001 to about 1.5, and in other embodiments from about 0.002 to about 1 seconds. As the skilled person appreciates, these pressurized contact times can be achieved by running at lines speeds of from about 1 to about 100 ft/min, in other embodiments from about 2 to about 50 ft/min, or in other embodiments from about 5 to about 20 ft/min.

Method of Installing Membrane

In one or more embodiments, the present invention provides a method for installing a roof system using the membrane composite described herein. In one or more embodiments, the method includes providing a first membrane composite and positioning the first membrane composite on a roof surface. The method then includes providing a second membrane composite and positioning the second membrane composite adjacent to the first membrane composite in an overlapping fashion so that the second membrane composite overlaps at least a portion of the lap region of the first membrane composite. As the skilled person understands, this provides a pre-sealed lap (also referred to as a pre-seamed lap) that can be subsequently sealed or seamed by heat welding or heat bonding procedures. According to methods of the present invention, the method then includes heat welding the pre-seamed lap to thereby form a seam between the first membrane composite and the second membrane composite, where the heat welding incorporates at least a portion of the protective film of the first membrane composite within the lap region to be incorporated into the seam (i.e. within the weld). That is, it should be appreciated that the protective film is not removed from the seam area prior to heat welding and becomes incorporated into the weld.

After heat welding the membrane composites to each other, the method then includes removing the remainder of the protective film from the first composite membrane to thereby expose the top planar surface of the membrane, which is the portion of the top planar surface not involved in the weld.

Those skilled in the art appreciate that the process of this invention may include securing the first membrane composite to the roof deck and/or one of the intervening layers of the roof system prior to positioning the second membrane composite adjacent thereto or in an overlapping configuration. The skilled person also understands that completion of the roof system will also include removal of the protective film from the second membrane composite. That said, the process of the present invention may, of course, include positioning, attaching, welding, and removing the protective film from additional rows or columns of membrane composite that may be installed based upon the width of the roof.

The step of positioning the membrane composite may take place in a conventional manner. For example, positioning of the membrane composite may include unrolling a roll of the membrane composite and manually adjusting the composite to the desired location. The composite, and more specifically the roofing membrane of the composite, can be secured to the roof surface using conventional techniques. For example, the membrane can be secured to the roof surface by using mechanical fasteners. In other embodiments, the membrane can be secured to the roof surface by using an adhesive. In particular embodiments, the adhesive is a pressure-sensitive adhesive that is pre-applied to the membrane (e.g. factory applied). The skilled person understands that when installing a membrane of this nature (i.e. with a pre-applied adhesive), the step of securing the membrane to the roof surface may include removing a release member that may be carried by the membrane composite in order to protect the pre-applied pressure sensitive adhesive.

Likewise, the step of thermally welding the membranes together may take place by using conventional procedures. As the skilled person appreciates, adjacent membranes positioned in a pre-seamed lap can be thermally welded by using conventional hot-air welders. Many of these welders are designed to direct hot air to the top surface of the lower membrane and the lower surface of the upper membrane, subsequently contact the two heated surfaces, and then apply pressure to complete the weld. The skilled person understands that the degree of heating is sufficient to fuse the membranes together in a manner that is sufficient to withstand forces experienced on a roof surface. As noted above, these welds desirably withstand peel forces such that failure under a peel test occurs at the lamination in the membrane, not at the weld.

In one or more embodiments, the step of removing the protective film from the membrane composite includes manually removing the film. As the skilled person will appreciate, this may include one or more individuals peeling and edge of the film from the membrane so that a larger portion of the film can be secured or grasped by the individual, which allows the film to be pulled with greater force and ultimately removed from the roofing membrane.

Figure 2:
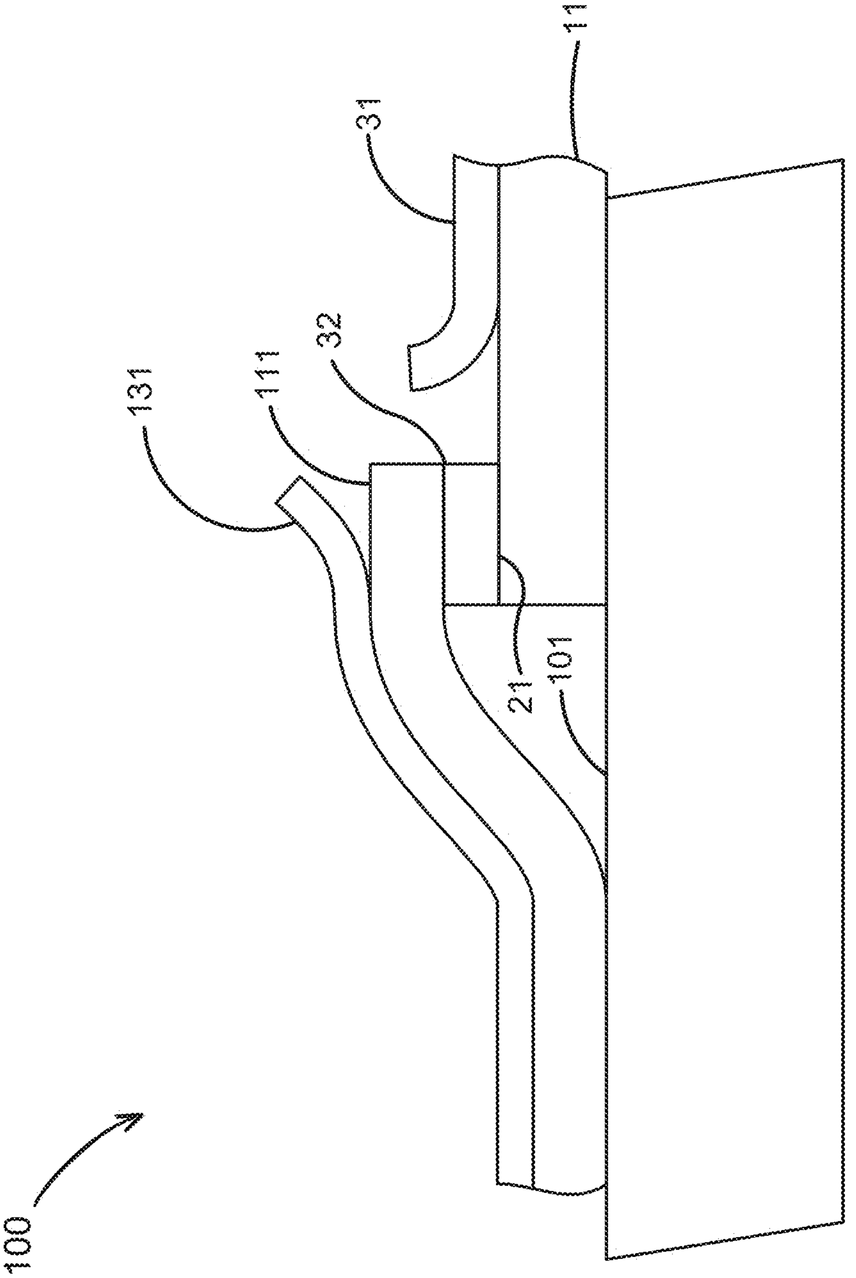
FIG. 2 is a cross-sectional view of a seam formed by practice of embodiments of the invention.

Aspects of the invention can be understood with reference to FIG. 2, which shows roofing system 100 including substrate 101 and roofing membranes 11, 111 secured thereto. Roofing membranes 11, 111 are welded to each other to form a seam within lap region 21 of membrane 11 and lap region 121 of membrane 111. Roofing membrane 11 carries protective film 31, which is shown as being partially peeled away. Roofing membrane 111 carries protective film 131, which is shown as being partially peeled away. A portion 32 of protective film 31 is incorporated into the seam. The skilled person understands that while FIG. 2 shows roofing membranes 11, 111, as well as portion 32 of protective file 31, as distinct layers, the welding process will cause the layers to fuse together and they therefore may not have distinct separations as shown.

Roof System

The thermoplastic membrane composites, as well as the methods of this invention, are useful for covering flat or low-sloped roofs to create a roofing system. Roofing systems are generally known in the art as generally disclosed in U.S. Publication Nos. 2022/0049063, 2021/0262233, and 2018/0094439, which are incorporated herein by reference. The substrate to which the thermoplastic membrane composites may be attached may include a roof deck, an insulation layer, a coverboard layer, or an existing layer of roofing membrane. Regardless of any intervening materials, the membrane may ultimately be mechanically attached to the roof deck using known techniques, which secure the membrane to the roof system in a manner that can withstand wind uplift forces as required by the industry.

Those skilled in the art appreciate that roof decks may include, for example, steel, concrete pads, wood beams, and foamed concrete. The insulation layer may include, for example, a layer of board stock (e.g. polyisocyanurate insulation board) or a layer or foam directly foamed in place. Where board stock is employed (i.e. insulation boards), these boards may carry a variety of facer materials including, but not limited to, paper facers, fiberglass-reinforced paper facers, fiberglass facers, coated fiberglass facers, metal facers such as aluminum facers, and solid facers such as wood. These boards are known as described in U.S. Pat. Nos. 6,117,375, 6,044,604, 5,891,563, 5,573,092, U.S. Publication Nos. 2004/0109983, 2003/0082365, 2003/0153656, 2003/0032351, and 2002/0013379, as well as U.S. Ser. Nos. 10/640,895, 10/925,654, and 10/632,343, which are incorporated herein by reference. Coverboards may include wood sheeting (e.g. OSB), fiber boards, masonite board, wall board, gypsum board, gypsum products such as DensDeck, perlite boards, and high density foam boards. As with the insulation boards, these coverboards may carry facers on the opposed planar surfaces of the board.

Existing membranes may include cured rubber systems such as EPDM membranes, thermoplastic polymers systems such as TPO membranes, or asphalt-based systems such as modified asphalt membranes and/or built roof systems.

Various modifications and alterations that do not depart from the scope and spirit of this invention will become apparent to those skilled in the art. This invention is not to be duly limited to the illustrative embodiments set forth herein.

What is claimed is:

1. A method of installing thermoplastic roof membranes within a roof system, the method comprising:

(i) positioning a first membrane composite on a surface of the roof system, where the first membrane composite includes a roofing membrane including a top planar surface, a bottom planar surface, a first lateral edge, and a second lateral edge, and a protective film removably bonded to the top planar surface, and wherein the bottom planar surface is placed adjacent to the surface of the roof system;

(ii) positioning a second membrane composite including a roofing membrane, wherein the roofing membrane includes a top planar surface, a bottom planar surface, a first lateral edge, and a second lateral edge, and a protective film removably bonded to the top planar surface adjacent to the first membrane composite in a partially overlapping manner to provide an overlapped area, wherein a portion of the protective film of the first membrane composite is disposed between the membranes of the first and second membrane composites in the overlapped area;

(iii) heat welding the first and second membrane composites together at the overlapped area while the portion of the protective film of the first membrane composite is disposed therebetween; and (iv) removing the remaining portion of the protective film from the first membrane composite.

2. The method of claim 1, further including securing the roofing membrane of the first membrane composite into the roof system.

3. The method of claim 1, further including securing the roofing membrane of the second membrane composite into the roof system.

4. The method of claim 1, further comprising removing at least a portion of the protective film from the second membrane composite.

5. The method of claim 1, wherein the heat welding forms a seam that cohesively fails before it adhesively fails when subjected to peel adhesion testing pursuant to ASTM D413-2017 (20 in/min).

6. The method of claim 1, wherein the protective film is thermally bonded to the top planar surface of the roofing membrane of the first membrane composite.

7. The method of claim 1, wherein the protective film extends from the first lateral edge to the second lateral edge of each of the respective membranes of the first and second membrane composites.

8. The method of claim 1, wherein the protective film is thermally bonded to the top planar surface of each of the respective membranes of the first and second membrane composites to create a thermal bond that is characterized by a peel strength, according to ASTM D413-2017 of from about 0.2 to about 2.0 lbf/in.

9. The method of claim 1, wherein the roofing membranes of the first and second membrane composites are scrim-reinforced thermoplastic membrane.

10. The method of claim 1, wherein the roofing membranes of the first and second membrane composites have a thickness of from about 1.0 to about 3.0 mm.

11. The method of claim 1, wherein the protective film of the first and second membrane composites have a thickness of from about 35 to about 125 μm.

12. A membrane composite comprising:

(i) a roofing membrane including a top planar surface, a bottom planar surface, a first lateral edge, and a second lateral edge; and (ii) a protective film bonded to the top planar surface in a manner that allows the protective film to be removed from the top planar surface, wherein the protective film and the roofing membrane are compatible, wherein compatible refers to the ability to weld the roofing membrane to a second identical roofing membrane with the protective film disposed therebetween to provide a weld that cohesively fails before it adhesively fails when subjected to peel adhesion testing pursuant to ASTM D413-2017 (20 in/min).

13. The membrane composite of claim 12, wherein the protective film is thermally bonded to the top planar surface of the roofing membrane.

14. The membrane composite of claim 12, wherein the protective film extends from the first lateral edge to the second lateral edge.

15. The membrane composite of claim 12, wherein the protective film is thermally bonded to the roofing membrane to create a thermal bond that is characterized by a peel strength, according to ASTM D413-2017 of from about 0.2 to about 2.0 lbf/in.

16. The membrane composite of claim 12, wherein the roofing membrane is a scrim-reinforced thermoplastic membrane.

17. The membrane composite of claim 12, wherein the roofing membrane has a thickness of from about 1.0 to about 3.0 mm.

18. The membrane composite of claim 12, wherein the protective film has a thickness of from about 35 to about 125 μm.

* * * * *